United States Patent
Galvin

(10) Patent No.: US 6,223,703 B1
(45) Date of Patent: May 1, 2001

(54) ENGINE

(76) Inventor: George Frederic Galvin, 9 Christchurch Road, Sidcup, Kent DA15 7HG (GB)

( * ) Notice: Subject to any disclaimer, the term of this patent is extended or adjusted under 35 U.S.C. 154(b) by 0 days.

(21) Appl. No.: 09/269,449

(22) PCT Filed: Sep. 26, 1997

(86) PCT No.: PCT/GB97/02649

§ 371 Date: Mar. 26, 1999

§ 102(e) Date: Mar. 26, 1999

(87) PCT Pub. No.: WO98/13581

PCT Pub. Date: Apr. 2, 1998

(30) Foreign Application Priority Data

Sep. 27, 1996 (GB) .................................................. 9620227

(51) Int. Cl.⁷ .............................. F01B 9/06; F02B 41/00
(52) U.S. Cl. ...................................... 123/48 B; 123/197.4
(58) Field of Search .............................. 123/197.3, 197.4, 123/197.2, 193.6, 48 B, 48 AA, 78 B, 78 E; 92/187, 256

(56) References Cited

U.S. PATENT DOCUMENTS

| 669,416 | 3/1901 | Johnson . |
| 1,539,769 | 5/1925 | Poillon, Jr. . |
| 2,323,742 | 7/1943 | Webster . |
| 2,372,472 | 3/1945 | Campbell . |
| 3,407,791 | * 10/1968 | Saarinen et al. .................... 123/48 B |
| 3,417,738 | * 12/1968 | Basiletti et al. .................... 123/48 B |
| 3,527,264 | * 9/1970 | Bachle ................................ 123/48 B |
| 3,667,433 | * 6/1972 | Isley ................................... 123/48 B |
| 3,704,695 | * 12/1972 | Cronstedt ........................... 123/48 B |
| 4,031,868 | * 6/1977 | Karaba et al. ..................... 123/48 B |
| 4,078,450 | * 3/1978 | Vallejos ............................. 123/48 B |
| 5,562,068 | * 10/1996 | Sugimoto et al. ................ 123/197.4 |

FOREIGN PATENT DOCUMENTS

| 3139686 | 4/1983 | (DE) . |
| 3414041 | 10/1984 | (DE) . |
| 705411 | 3/1954 | (GB) . |
| 2080484 | 2/1982 | (GB) . |
| WO 85/01312 | 3/1985 | (WO) . |

* cited by examiner

Primary Examiner—Marguerite McMahon
(74) Attorney, Agent, or Firm—Baker & Daniels

(57) ABSTRACT

An engine comprises a cylinder, a combustion chamber, a piston reciprocable within the cylinder, a connecting rod and a rotatable output shaft. The piston is in drivable connection with the output shaft via the connecting rod, a drive ring and a torque lobe. The torque lobe is a circular plate eccentrically mounted on the output shaft for rotation therewith about the axis thereof. The drive ring is an annular sleeve which is rotatable around the rim of the torque lobe and is in contact therewith. The connecting rod is slidably mounted with respect to a carrier fixed to the drive ring for axial movement relative thereto. One end of the connecting rod is pivotally fixed to the piston, the other end of the connecting rod being engageable with a cam fixed to the torque lobe, whereby rectilinear movement of the piston is converted to rotary movement of the torque lobe or vice versa. The cam and the mounting of the connecting rod with respect to its carrier are such that the turning movement of the output shaft is maximised substantially at the same time as the pressure of expanding gases resulting from ignition within the combustion chamber is maximised.

34 Claims, 9 Drawing Sheets

ENGINE

This invention relates to an engine, and in particular to an internal combustion engine.

A conventional internal combustion engine employs a crankshaft to convert the reciprocating motion of the piston (s) into output torque to propel a vehicle or to act upon any other load. The crankshaft is inefficient in terms of converting the power available from the fuel combustion into usable output torque. This is because combustion of the fuel/air mixture takes place at approximately the top dead centre (TDC) position of the piston. The crankpin and the crankshaft main bearings are consequently subjected to periodic heavy stresses. What is of greater significance, however, is that, with an inner combustion engine provided with conventional drive gear, the ignited fuel/air pressure forces cannot produce torque when the piston is either at TDC or bottom dead centre (BDC), as the connecting rod and the crankpin are practically in a straight line so that there is no force component tangential to the crank circle. This results in most of the available energy being lost as heat. The torque necessary to carry the crankshaft through these two dead centre positions is supplied by the inertia of the flywheel of the engine. Moreover, by the time the crankshaft has rotated through almost 90° beyond TDC, where the turning moment is a maximum, the piston force is greatly reduced, so that the resulting torque is relatively small.

Thus, in the four-stroke version of a conventional internal combustion engine, the crankshaft has to revolve twice to complete all the strokes necessary for full operation. The strokes are:

1. The induction stroke during which the inlet valve is open, the exhaust valve is closed, and a fuel and air mixture is drawn into the cylinder as the piston descends.
2. The compression stroke, during which the inlet and exhaust valves are closed, the fuel/air mixture is compressed as the piston rises, and is ignited by a timed spark a number of degrees before TDC.
3. The power stroke, during which the inlet and exhaust valves are closed, and the burning, hence rapidly expanding mixture, forces the piston down at an initially high pressure and temperature. The pressure and temperature, however, fall rapidly as the piston reaches BDC.
4. The exhaust stroke, during which the inlet valve is closed, the exhaust valve having been opened about 60° before BDC on the power stroke (to assist removal of exhaust gases, i.e. scavenging). The ascending piston displaces most of the used gases out of the exhaust valve until the piston is again at TDC for the induction stroke.

It should be noted that, at TDC at the end of the compression stroke, although the pressure in the cylinder is at almost a maximum, the ability of the crank to turn, i.e. the turning moment, is zero. Furthermore, owing to the fuel having been ignited before TDC, the time that this takes before the piston reaches TDC, is time when a reverse turning moment is being applied to the piston. Because the engine is unable to reverse during this period due to a flywheel giving inertia, the work generated by the expanding gases can only be converted into heat which eventually heats the cooling water or air, as the case may be, which surrounds the cylinder and so is not available for doing work on the piston.

During the early part of the power stroke, the turning moment increases approximately with the sine of the angle of rotation from TDC, so does not reach a maximum value until around 90° of rotation, when the pressure in the cylinder has fallen to almost half of its initial value. Much more heat is lost during this time and is, therefore, not available for work on the piston. By the time the piston has reached BDC on the power stroke, the exhaust valve has opened at about 60° before BDC, preventing any pressure remaining in the cylinder from acting on the piston and the correcting rod to produce crankshaft rotation. The exhaust gases are, therefore, released at a higher temperature and pressure than they would be if released at BDC. The early opening of the exhaust valve is necessary in the conventional engine to utilise this higher pressure to increase the velocity of the exhaust gases to ensure their adequate removal from the cylinder before the induction stroke commences. This exhaust pressure is lost to atmosphere and is not available for work on the piston.

Thus, the pressure is at maximum around TDC, whilst the turning arm reaches a maximum at about 80° to 90° after TDC, as is shown in FIG. 1 which is a graph showing both the pressure p in the cylinder and the turning arm m over the power stroke. As it is the product of the pressure and the turning arm length normal to the pressure direction which produces the output torque of the engine, then clearly the engine would be greatly improved if these parameters could be matched (i.e. rise and fall together). The output torque t of a conventional engine over the power stroke is shown in FIG. 2.

According to a first aspect, the present invention provides an engine comprising a cylinder, a combustion chamber, a piston reciprocable within the cylinder, a connecting rod and a rotatable output shaft, the piston being in drivable connection with the output shaft via the connecting rod, a drive ring and a torque lobe, wherein the torque lobe is a circular plate eccentrically mounted on the output shaft for rotation therewith about the axis thereof, wherein the drive ring is an annular sleeve which is a rotatable sliding fit around the rim of the torque lobe, and wherein the connecting rod is slidably mounted with respect to a carrier fixed to the drive ring for axial movement relative thereto, one end of the connecting rod being pivotally fixed to the piston, the other end of the connecting rod being engageable with a cam fixed to the torque lobe whereby rectilinear movement of the piston is converted to rotary movement of the torque lobe or vice versa, the cam and the mounting of the connecting rod with respect to its carrier being such that the turning moment of the output shaft is maximised substantially at the same tine as the pressure of expanding gases resulting from ignition within the combustion chamber is maximised.

Advantageously, means are provided for biassing the connecting rod towards the output shaft relative to the carrier, and preferably a spring acting between the connecting rod and the carrier constitutes the biassing means.

The arrangement may be such that said other end of the connecting rod engages the cam only over the power and exhaust strokes of a four-stroke cycle. In this case, the cam may have first and second cam faces, said other connecting rod end engaging the first cam face on the power stroke, and engaging the second cam face on the exhaust stroke.

Conveniently, the engine further comprises detachable locking means for locking the connecting rod to the carrier prior to the commencement of the induction stroke. Preferably, the locking means is such that the connecting rod is locked to the carrier only over the compression and induction strokes, thereby preventing the spring biassing the connecting rod towards the output shaft and into engagement with the cam. The locking means may be constituted by a pair of alignable holes within the connecting rod and the carrier and by a locking member movable between a first, unlocked position in which it lies wholly within one of said holes, and a second, locked position in which it lies partially within both holes. Preferably, said one hole is within the carrier.

In a preferred embodiment the engine further comprises means for biassing the locking member towards its second position. A leaf spring may constitute said biassing means, one end of the leaf spring being fixed to the carrier, the other end being engageable with the locking member.

Advantageously, the engine further comprises actuating means for releasing the locking means prior to the commencement of the power stroke. The actuating means may be constituted by an actuating rod engageable with an unlocking member housed at least partially within the hole in the connecting rod. Preferably, movement of the connecting rod relative to the carrier to align their holes is controlled in dependence upon the engagement of said other end of the connecting rod with a third cam face provided on the cam between the second cam face and the first cam face.

In a preferred embodiment, the piston has a main piston body and a piston crown movable anally relative thereto, spring means acting between the piston crown and the main piston body biassing the piston crown away from the main piston body, and wherein the actuating rod is carried by the piston crown, thereby biassing the actuating rod out of engagement with the unlocking member unless the pressure of expanding gases in the combustion chamber acts to compress said spring means.

In this case, the arrangement may be such that ignition takes place before the piston reaches TDC on the compression stroke, and such that the spring means is compressed, thereby storing energy, by the expanding gases resulting from its combustion following ignition.

Advantageously, the carrier is hollow, and the connecting rod is positioned within the carrier, the connecting rod and the carrier each being provided with a pair of diametrically-opposed holes, a pair of locking members, a pair of unlocking members, and a pair of leaf springs, the actuating rod being engageable with the inner ends of the unlocking members, and the outer ends of the unlocking members being in engagement with the inner ends of the locking members.

Conveniently, there are a pair of drive rings and a pair of associated torque lobes, the carrier is fixed to the drive rings, and the cam is positioned between the two torque lobes.

Preferably, said other end of the connecting rod is provided with a cam follower for engagement with the cam, a needle roller bearing constituting the cam follower.

As mentioned above, a conventional internal combustion engine is such that most of the available energy being lost as heat. If ignition takes place too early, most of the pressure generated is wasted trying to stop the engine (as this pressure tries to force the piston in the opposite direction to which it is travelling during the compression stroke); and, if left too late, the pressure is reduced due to the increasing volume above the piston as it start its descent for the power stroke. The optimum maximum pressure point varies from engine to engine, but is around 12° after TDC on average.

According to a second aspect, the present invention provides a piston and connecting rod assembly for an internal combustion engine, the assembly comprising a piston, a connecting rod, and a spring, the connecting rod having a first end operatively associated with the piston for movement therewith, and a second end connectible to a rotary output shaft, wherein the spring acts between the piston and the connecting rod to bias the connecting rod away from the crown of the piston.

Advantageously, the piston is hollow, and the connecting rod is connected to the piston by a gudgeon pin, and the spring acts between the piston crown and the gudgeon pin, the gudgeon pin being movable relative to the piston in the axial direction thereof. In this case, the gudgeon pin may be mounted within a carrier which is slidably mounted within the hollow piston for axial movement relative thereto.

Preferably, movement of the carrier within the piston is limited by the spring in the direction of movement towards the crown, and by a stop member fixed in the interior of the piston in the direction of movement away from the crown.

In a preferred embodiment, a set of disc springs constitutes the spring. Conveniently, the disc springs are made of titanium.

The invention also provides an internal combustion engine comprising a cylinder, a piston and connecting rod assembly as defined above, a rotary output shaft, means for igniting a fuel/air mixture in the cylinder, and means for actuating the ignition means the actuating means being such that ignition takes place before the piston reaches TDC on the compression stroke, and the arrangement is such that the spring is compressed, by the expanding gases resulting from the combustion following ignition, before the piston reaches TDC.

The invention will now be described in greater detail, by way of example, with reference to the drawings, in which.

Figure 3:
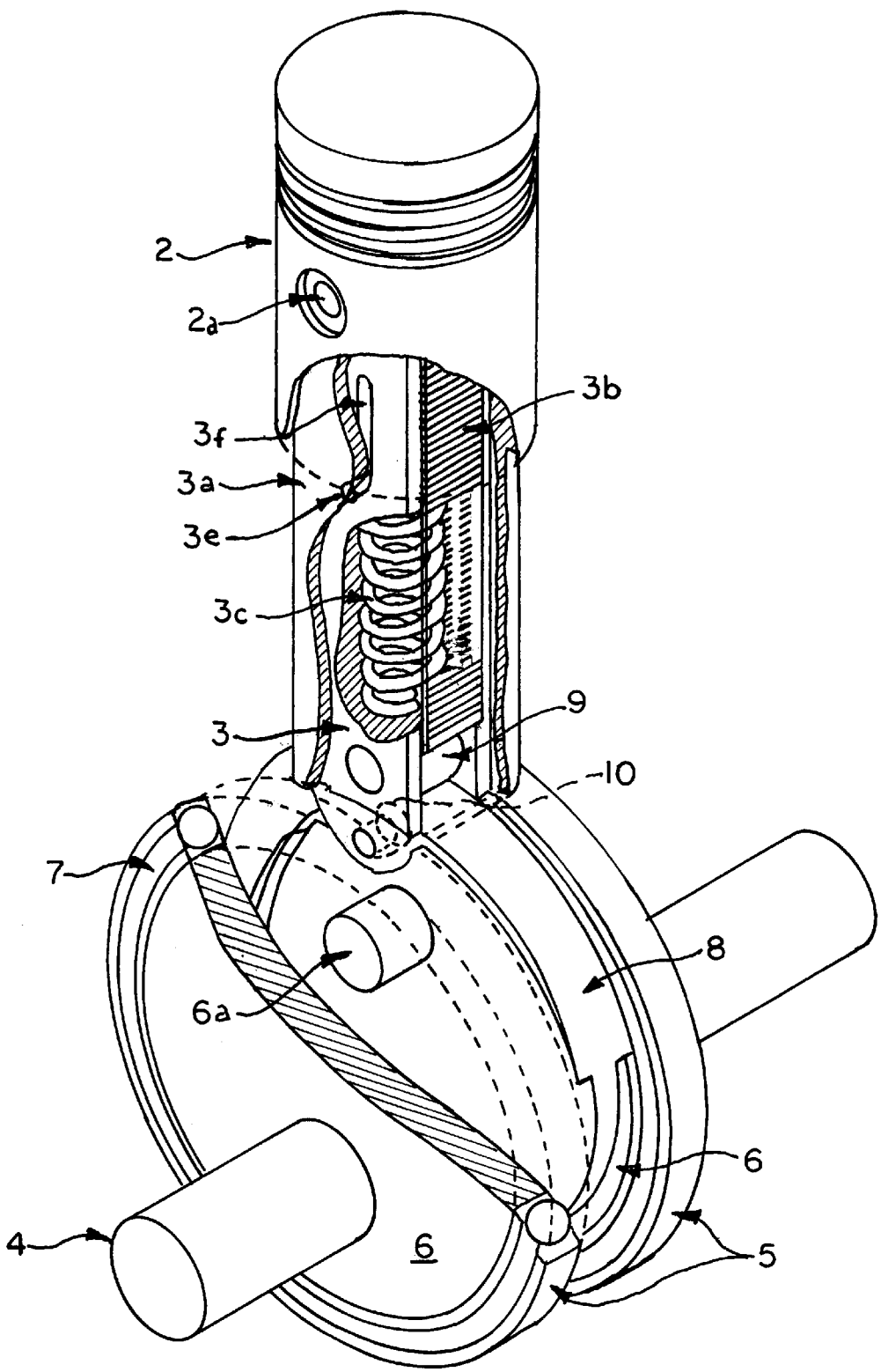
FIG. 3 is a perspective view of an internal combustion engine incorporating a crank mechanism constructed in accordance with the invention.
Figure 4:
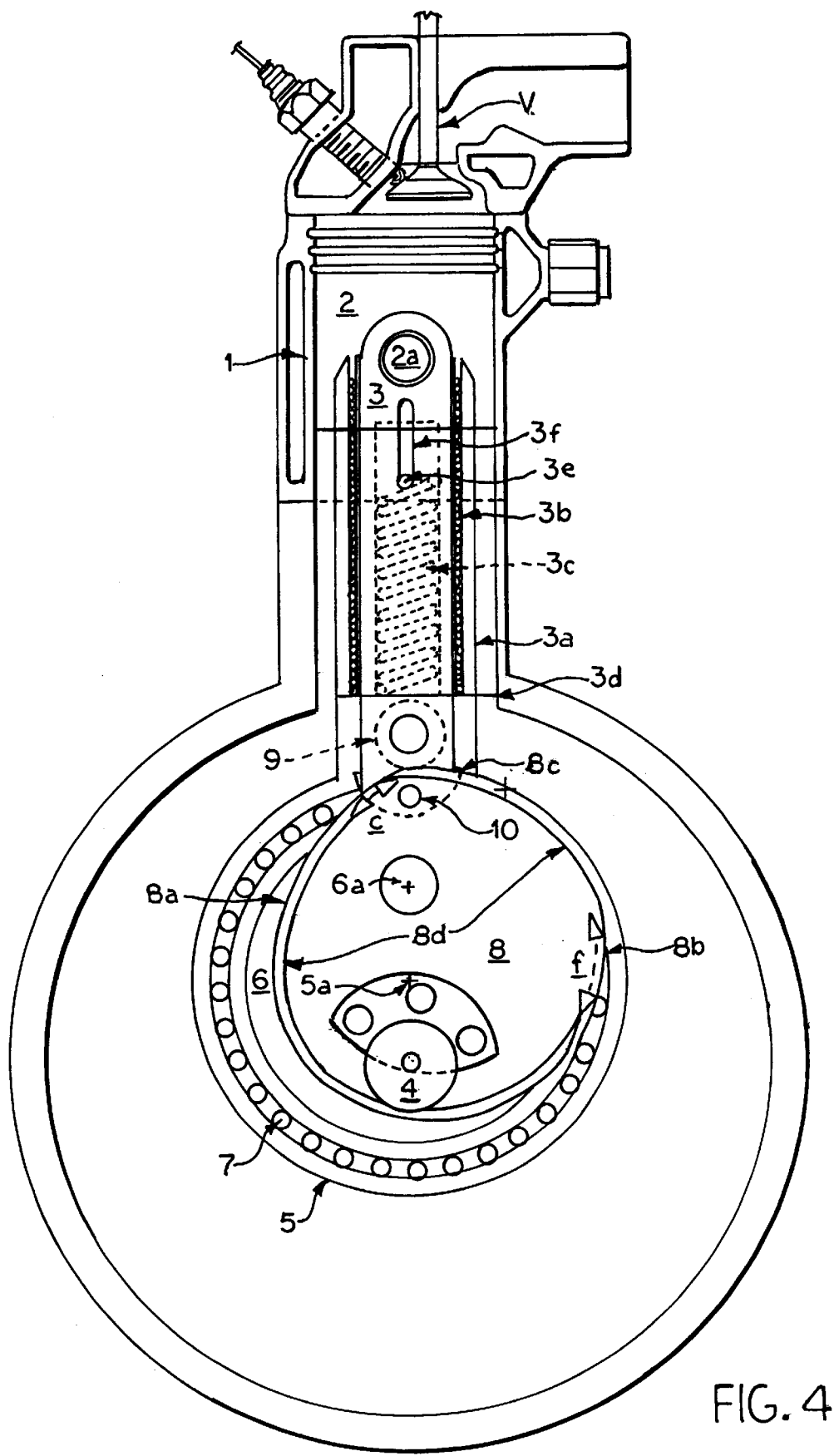
FIG. 4 is a front elevation of the engine of FIG. 3, and shows the connecting rod in more detail.
Figure 5:
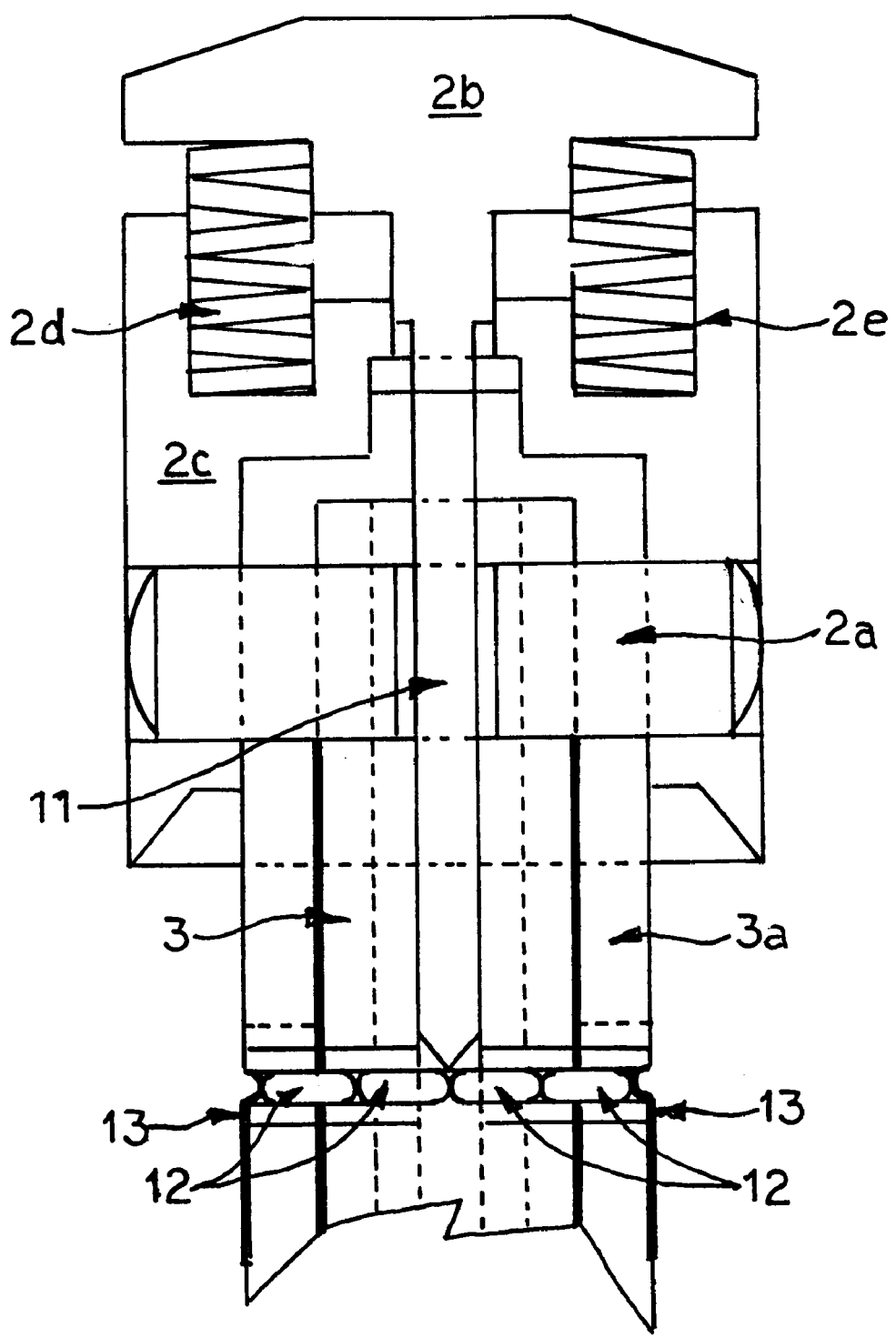
FIG. 5 is a schematic front elevation of part of the piston and crank mechanism of FIG. 3.

Referring to the drawings, FIGS. 3 to 5 show an internal combustion engine having a single cylinder 1 in which a piston 2 is reciprocable. The cylinder 1 is made of cast iron, and the piston 2 is made of aluminium. The piston-and-cylinder arrangement 1, 2 has a conventional valve arrangement indicated generally by the reference V, and can be powered by petrol, diesel or any other acceptable fuel. A connecting rod 3 is pivotally fixed to the piston 2, the connecting rod rotatably driving an output shaft 4 via a pair of drive rings 5 (see FIG. 3) and a pair of torque lobes 6

(only one of which is shown in FIG. 4). The connecting rod 3, the drive rings 5 and the torque lobes 6 are made of carbon steel. The connecting rod 3 is hollow and is slidably mounted in a hollow carrier 3a by means of a needle roller bearing 3b. The carrier 3a is also made of carbon steel. The upper end of the connecting rod 3 is pivotally connected to the piston 2 by a gudgeon pin 2a, and the lower end of the carrier 3a is fixed to the drive rings 5. A helical spring 3c made of spring steel is provided to bias the connecting rod 3 downwards (that is to say away from the piston 2 and towards the output shaft 4) with respect to the carrier 3a. The spring 3c acts between the base 3d of the connecting rod 3 and a pin 3e which passes diametrically through the interior of the carrier 3a and through an elongate longitudinal slot 3f in the connecting rod 3 The spring 3c thus biases the connecting rod 3 downwards. Each torque lobe 6 is constituted by a circular plate, which is eccentrically mounted on the shaft 4, the distance between the centre of eccentricity 5a (see FIG. 4) and the centre of the shaft 4 being the crank throw. The centre of eccentricity 5a is the centre of the drive rings 5.

As shown best in FIG. 3, each drive ring 5 is an annular sleeve which can slide round the associated torque lobe 6 as it rotates. Each drive ring 5 is attached to a ring (not shown) fixed to the outer race of a ball bearing 7 whose inner race is fixed to the peripheral edge of the associated torque lobe 6. Roller or plain bearings could be used in place of the ball bearings.

A cam 8, made of carbon steel is provided, being fixed between the two torque lobes 6 by a drive pin 6a. The cam 8 has a curved drive cam face 8a, a curved exhaust cam face 8b, and a locking/unlocking face 8c. A cam follower 9, constituted by a needle roller bearing, is fixed to the lower end of the connecting rod 3. The can follower 9 is held in position against the cam 8 by the force of the spring 3c and by a pair of restraining wheels 10 which ride inside the cam on faces 8d which project laterally from opposite sides thereof.

The connecting rod 3 and the carrier 3a are provided with means for releasably locking them together, this means being shown in FIG. 5. The piston 2 of the engine is of two-part construction, having a piston crown 2b and a main piston body 2c. A stack of disc springs 2d, made of titanium is positioned in a recess 2e formed in the main piston body 2c, the stack of disc springs acting between the base of the recess and the piston crown 2b.

An lactating rod 11, made of carbon steel, is bolted to the piston crown 2b, the actuating rod extending through a hole in the gudgeon pin 2a and downwards within the hollow connecting rod 3. Two pairs of actuating beads 12 made of carbon steel are slidably mounted in holes drilled in diametrically-opposite regions of the connecting rods 3 and the carrier 3a, A respective actuating bead 12 is positioned within each of these holes. Respective leaf springs 13, made of spring steel, are fixed to the carrier 3a, at diametrically-opposed positions, so that the free ends of the leaf springs act against the two actuating beads 12 positioned within the holes in the carrier, thereby biassing all four actuating beads 12 radially inwardly.

When the piston crown 2b moves down relative to the main piston body 2c, against the force of the disc springs 2d, it carries the actuating rod 11 with it. The tip of the actuating rod 11 then engages the inner radial ends of the actuating beads 12 positioned wit, and extending radially inwardly from, the holes in the connecting rod 3, thereby forcing the beads radially outwardly away from the positions shown in FIG. 5, so that each bead 12 is wholly within its associated hole, whereby the connecting rods 3 and the carrier 3a are free to move longitudinally relative to one another.

When the piston crown 2b moves up relative to the main piston body 2c, under the biassing force of the disc springs 2d, the tip of the actuating rod 11 moves out of engagement with the inner beads 12, so that (assuming the holes in the connecting rod 3 and the carrier 3a are aligned) the leaf springs 13 act to bias all four actuating beads radially inwardly. This results in each of the outer two actuating beads 12 engaging within the adjacent holes in the connecting rod 3 and the carrier 3a, thereby locking the connecting rod to the carrier.

The operation of the single cylinder engine of FIGS. 3 to 5 will now be described. The operating cycle is best understood by describing the operation of a four-stroke cycle starting with the piston 2 at TDC at the end of the exhaust stroke. In this position, the connecting rod 3a is locked to the carrier 3a by the outer actuating beads 12, as is described below. At the end of the exhaust stroke, the cam follower 9 has just moved along the locking/unlocking face 8c of the cam 8, axially aligning the actuating beads 12 as shown in FIG. 5. As there is no combustion or compression pressure above the piston crown 2b at this stage of the four-stroke cycle, the disc springs 2d are effective to bias the piston crown 2b upwardly with respect to the main piston body 2c thereby placing the actuating rod 11 in the position shown in FIG. 5, allowing the leaf springs 13 to force the outer actuating beads into the locking position. The connecting rod 3 is, therefore, locked to the carrier 3a. As the cam follower 9 leaves the locking/unlocking face 8c for commencement of the induction stroke, the spring 3c forces the connecting rod 3 downwards, ensuring that the locking mechanism is prevented from unlatching before being required so to do.

After the piston 2 is carried past TDC, the momentum of the rotating masses causes the piston and the drive rings 5 down into the induction stroke. At the start of the induction stroke, fuel and air are drawn into the cylinder 1 via the valve arrangement V. As the connecting rod 3 is locked to the carrier 3a, the spring 3c cannot move the connecting rod down relative to the carrier. Consequently, the cam follower 9 is not moved down into contact with the drive face 8a of the cam 8 as the piston 2 executes the induction stroke.

Once the piston 2 has passed BDC, it is carried upwards into the compression stroke by the momentum of the torque lobes 6 and/or the flywheel. As the connecting rod 3 and the carrier 3a remain locked together, the cam follower 9 does not engage the cam face 8b of the cam 8 during the compression stroke.

The cam follower 9 then engages the locking/unlocking face 8c at 30° before TDC. As the piston 2 and the connecting rods 3 rise towards the end of the compression stroke, the compression pressure is felt on the piston crown 2b. As the cam follower rides 9 along the locking/unlocking face 8c, the holes in the connecting rod 3 and the carrier 3a are aligned, and the pressure on the piston crown 2b is effective to move the piston crown downwardly a small distance (about 2 mm) relative to the main piston body 2c, this movement being insufficient to move the tip of the actuating rod 11 into contact with the inner ends of the inner actuating beads 12. If ignition did not occur, this small amount of movement would, therefore, not be sufficient to cause unlocking of the connecting rod 3 from the carrier 3a. However, as ignition does take place (between 10° and 40° before TDC depending on engine speed), the pressure in the cylinder 1 above the piston crown 2b rises rapidly, causing the piston crown to move further downwards relative to the main piston body 2c. The actuating rod 11 thus moves further down a sufficient distance that its tip engages the inner ends of the inner actuating beads 12 to unlock the connecting rod 3 from the carrier 3a. As the cam follower 9 leaves the locking/unlocking face 8c to commence the power stroke, it is forced down into contact with the drive cam face 8a of the cam 8 by the combustion pressure in the cylinder 1, being carried down with the connecting rod 3 (the carrier 3a no longer being locked to the connecting rod). The design of the hemispherical end faces of the actuating beads 12 allows for a wide range of tolerance of gas pressure on ignition, and ensures that, with minimal movement of the piston crown 2b above that caused by the compression alone, the connecting rod 3 is released from the carrier 3a for the power stroke.

Ignition having taken place at a predetermined time before TDC, the expanding gases formed by the combustion force the piston 2 to descend rapidly within the cylinder 1 during the power stroke. A considerable turning moment is, therefore, exerted on the cam face 8a which, in turn, rotates the cam 8, the torque lobes 6 and the output shaft 4, the mean turning moment being a minimum of 50% greater than that of a conventionally-cranked engine.

The movement of the piston crown 2b relative to the main piston body 2c, against the force of the disc springs 2d, stores energy in these springs. This leads to a reduction in the pressure and temperature of the combustion gases, and therefore the heat lost through the walls of the cylinder 1. The action of this arrangement means that, when the engine is firing normally, there will be movement of the piston 2 with respect to the carrier 3a on every power stroke. Following ignition, the pressure in the cylinder 1 will build up to a high value, and the piston crown 2b is forced downwardly with respect to the main piston body 2c, thereby increasing the volume above the piston causing a reduction in pressure and temperature in the cylinder. The lowered temperature reduces radiation losses and the heat lost to the cooling water and subsequently to the exhaust, with the pressure being shared equally between the cylinder clearance volume and the disc springs 2d. This energy stored in the disc springs 2d is released when the piston 2 has passed TDC, and leads to the production of output torque during the power stroke. This is achieved as the spring pressure is now combined with the cylinder pressure after TDC. A large proportion of this stored energy would otherwise have been lost as heat.

After BDC, the piston 2 commences the exhaust stroke, with the connecting rod 3 and the carrier 3a still in the unlocked position. The cam follower 9 rides along the locking/unlocking face 8c towards the end of the exhaust stroke. As this happens, the holes in the connecting rod 3 and the carrier 3a are aligned. As there is no pressure above the piston 2 tending to compress the disc springs 2d, these springs are effective to lift the tip of the actuating rod 11 away from engagement with the inner ends of the actuating beads 12, so that the leaf springs 13 force all four of the actuating beads 12 radially inwardly, thereby locking the connecting rod to the carrier. On completion of the exhaust stroke, therefore, the piston 2 has returned to its "starting" position with the connecting rod 3 locked to the carrier 3a ready for the next induction stroke.

The restraining wheels 10 ride inside the cam 8 on the faces 8d for the power and exhaust strokes, assisting in preventing any tendency for the cam follower 9 to lift from the cam. A slot e between the cam faces 8d allows the restraining wheels 10 to exit the inside cam face, allowing the engine to complete the induction and compression strokes with the connecting rod 3 locked to the carrier 3a. These two strokes are caused by the inertial rotation of the flywheel, the torque lobes 6, the bearings 7 and the shaft 4. The offset (the distance between the point 5a and the centre of the shaft 4) of the torque lobes 6 is equivalent to the crank throw radius of an equivalent standard engine.

During the latter half of the compression stroke, the restraining wheels 10 re-engage the associated cam face 8d via a slot f, so that the engine is in the correct position for the power stroke.

Figure 1:
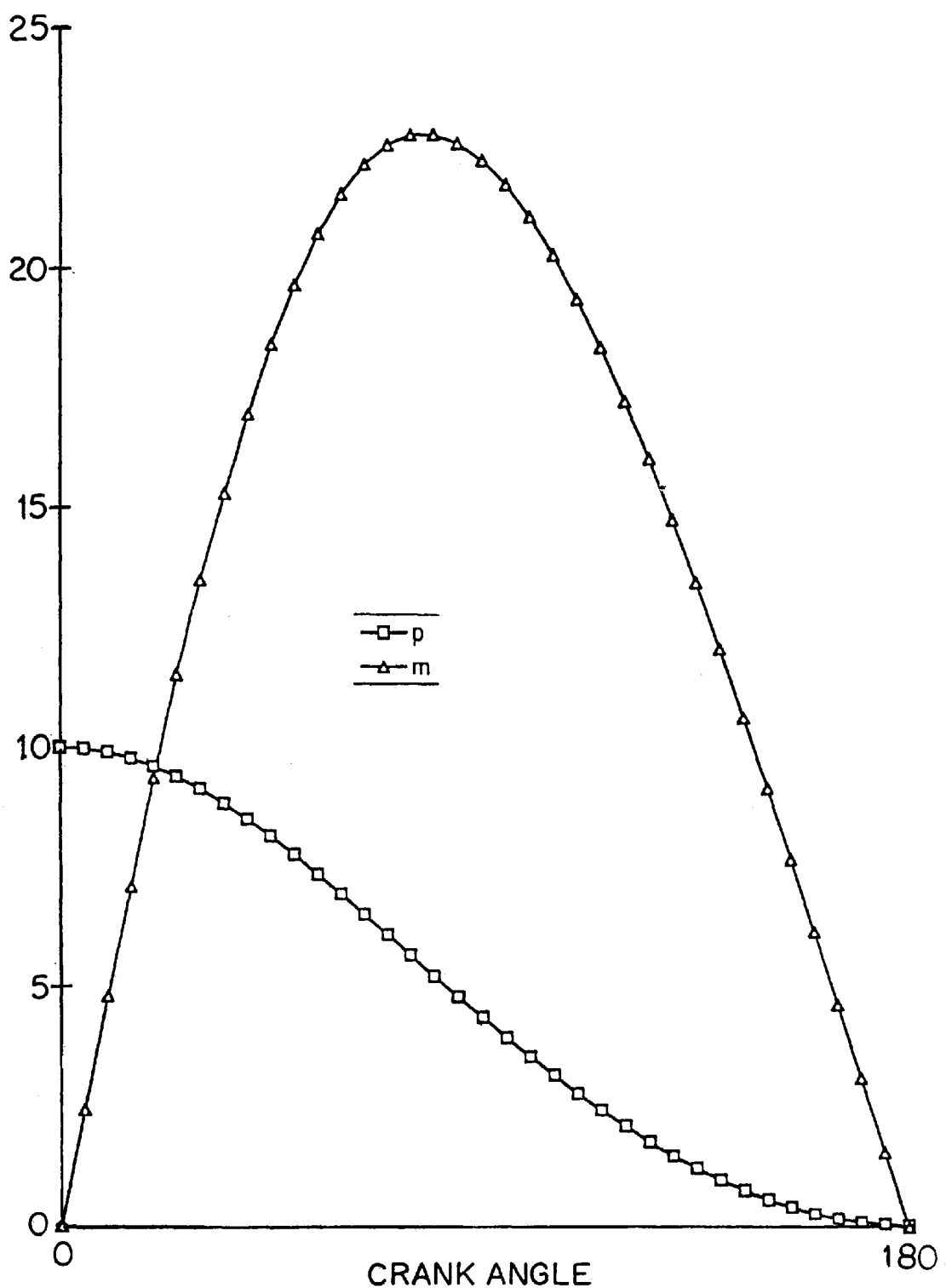
FIG. 1 is a graph showing the cylinder pressure and turning moment of one cylinder of a conventional internal combustion engine during the power stroke.
Figure 2:
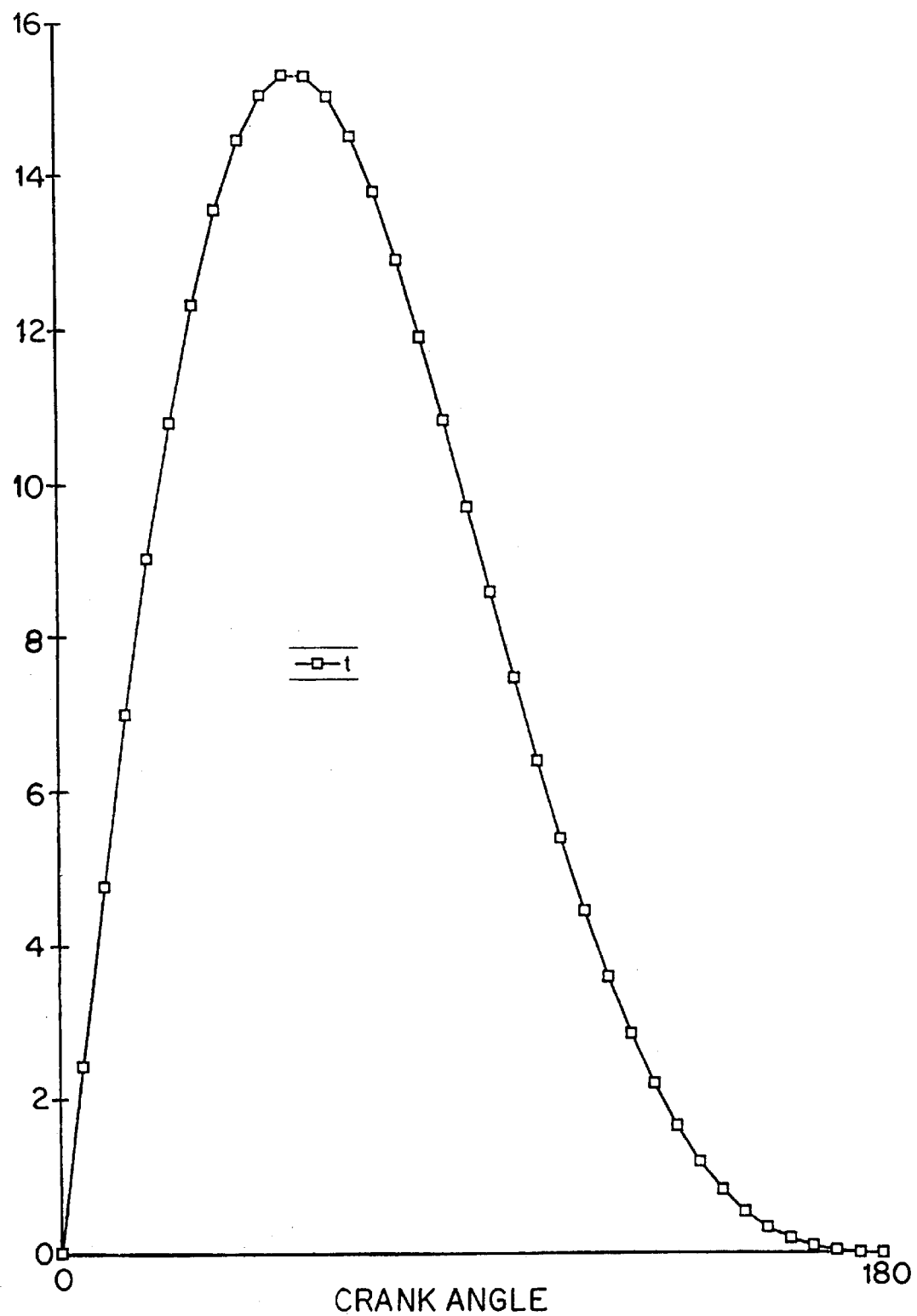
FIG. 2 is a graph showing the output torque of the cylinder of the conventional engine during the power stroke.
Figure 6:
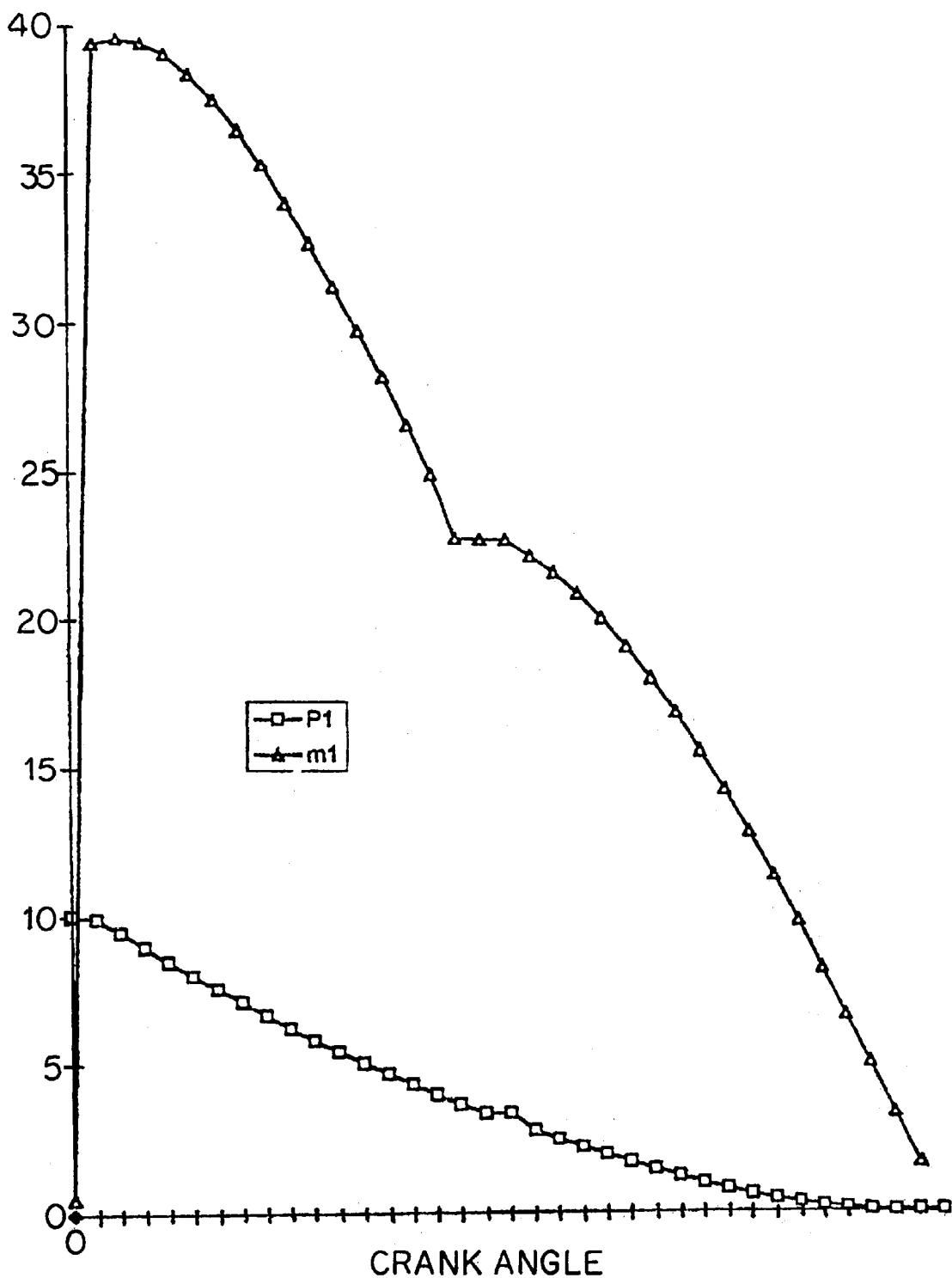
FIG. 6 is a graph similar to FIG. 1, but showing the cylinder pressure and turning moment of the engine of FIGS. 3 to 5 during the power stroke.
Figure 7:
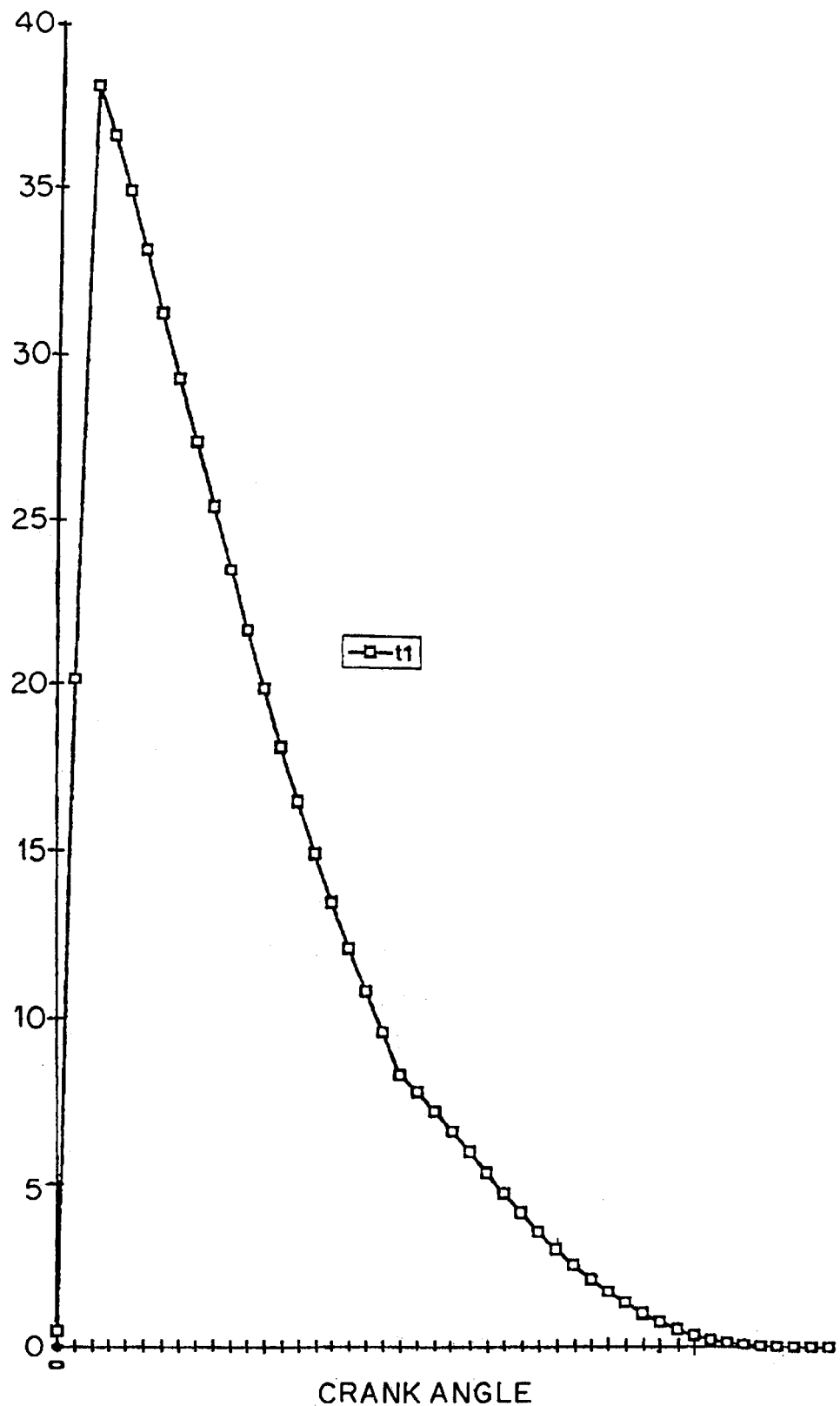
FIG. 7 is a graph similar to that of FIG. 2, but showing the output torque of the cylinder of the engine of FIGS. 3 to 5 during the power stroke.

This engine exhibits the following advantageous features:

(1) The turning arm derived from the cam 8 and the connecting rod/carrier configuration 3, 3a is closely matched with the engine combustion pressure characteristics. This, coupled with the energy stored in the disc springs 2d, is such that its efficiency is 100% greater than an equivalent standard engine, output torque being equal to the cylinder pressure times the turning arm. Thus, when comparing FIG. 6 with FIG. 1, it will be apparent that the turning arm $m^1$ of the engine of FIGS. 3 to 5 is much larger than that of a conventional engine. Similarly, by comparing the graphs of FIGS. 2 and 7, it will be apparent that the output torque $t^1$ of the engine of FIGS. 3 to 5 is much larger than that of a conventional engine. It is this feature that produces a 55% increase in overall efficiency, independent of efficiency increases resulting from the energy stored in the springs 2d.

(2) The power stroke is 50% longer than the induction stroke, which allows more effective utilisation of the available combustion energy and more complete burning of the fuel, thereby reducing the exhaust emissions, in particular the unburnt hydrocarbons.

(3) The energy storage mechanism constituted by the disc springs 2d reduces the rise in temperature and pressure in the combustion chamber after ignition, thereby reducing the amount of energy lost as heat through the cylinder walls, and storing a proportion of this energy for use after TDC for work on the output shaft 4. This reduction in combustion temperature greatly reduces the undesirable nitrous oxides in the exhaust emissions.

(4) As the exhaust stroke is also 50% longer than the induction stroke, the piston 2 will attain an increased velocity over this stroke, as it has a greater distance to travel. This increase in velocity for a given rpm will increase the velocity of the exhaust gases, thereby improving engine scavenging.

(5) As a result of (4), the exhaust valves may be left closed until just before BDC, thereby utilising any remaining pressure in the cylinder 1 for turning the output shaft 4.

(6) The employment of the helical spring 3c in the connecting rod 3, keeps the cam follower 9 in contact with the cam 8 on the power and exhaust strokes, producing a mass/sprig arrangement in series with the mass/spring arrangement of the disc springs 2d and the mass of the crank components plus the flywheel, these having a natural resonant frequency defined by the formula $$f = \tfrac{1}{2}\pi\sqrt{(k1/m1)} = \tfrac{1}{2}\pi\sqrt{(k2/m2)}$$

where k1 is the spring compliance of the spring 3c, m1 is the mass of the piston 2, the connecting rod 3 and the spring 3c, k2 is the spring compliance of the disc springs 2d, and m2 is the mass of the piston, the connecting rod, the springs 3c and 2d and the crank components plus the flywheel. This frequency can be designed, by suitable choice of masses, to be in the practical range of from say 1500 to 3000 rpm. This means that the engine can be controlled electronically to run at its resonant speed extremely effectively, and also makes this engine an ideal device for the power unit driving an alternator/rectifier for recharging batteries in a hybrid battery-powered electric/internal combustion engine car, the number of batteries required for such a hybrid being less than that for a battery only car.

(7) Not only does this engine reduce the emissions of hydrocarbons and nitrous oxides, but also overall exhaust emissions are greatly reduced owing to the fact that the engine has a much reduced fuel consumption than an equivalent standard engine, averaging a minimum 33% increase in mpg with the piston energy storage springs (the disc springs 2d) alone.

(8) Because of the greatly improved efficiency of the engine, it will reduce (or even eliminate) the need for engine cooling, so that the engine may require no cooling system, gear box, radiator, prop shaft or water pump, thereby reducing engine weight and space occupied. This enables further battery capacity to be utilised for a given automobile engine application.

(9) An effectively designed hybrid system could run on batteries only in towns, the batteries being charged up by the internal combustion power unit when the vehicle is used out of town and the power unit is turned on.

Figure 8:
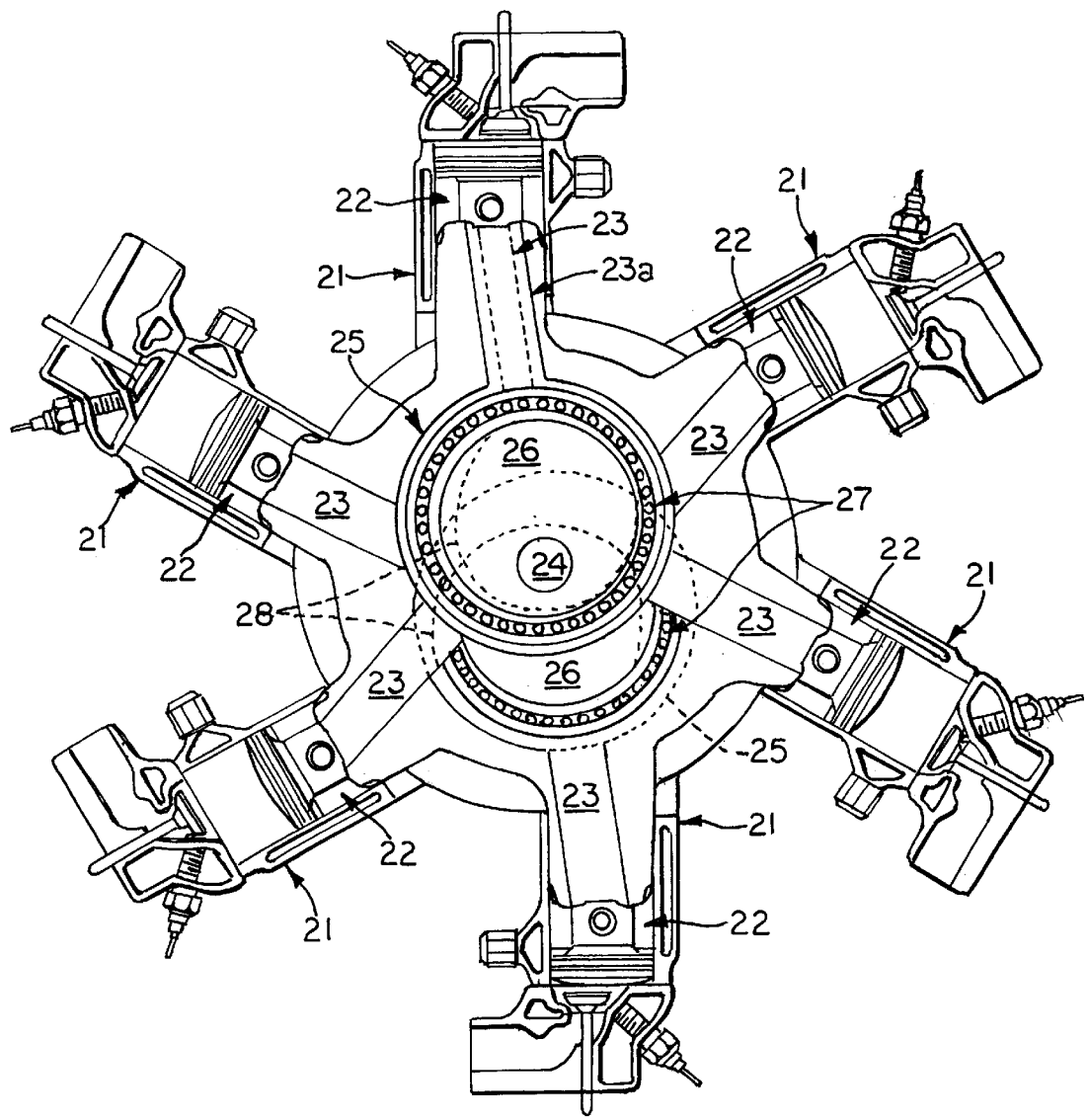
FIG. 8 is a plan view of a practical form of internal combustion engine incorporating the crank mechanism of FIGS. 3 to 5.

FIG. 8 shows a practical form of internal combustion engine incorporating the crank mechanism of FIGS. 3 to 5, this engine having two banks of three cylinders 21, each acting on a pair of respective torque lobes 26. Each cylinder 21 has a respective piston 22, connecting rod 23, and carrier 23a (which is shown only on the top piston), and drive rings 25, and its torque lobes 26 are eccentrically mounted on a common output sbaft 24. Each drive ring 25 is attached to a ring (not shown) fixed to the outer race of a respective roller bearing 27 whose inner race is fixed to the peripheral edge of the associated torque lobe 26. The drive rings 25 of each pair are rigidly attached to the associated carrier 23a. The torque lobes 26 of each bank are rigidly attached to each other, to the cams 28, and to the output shaft 24 for rotation therewith. Each bank of cylinders 21 is a flat radial configuration with the output shaft 24 acting vertically downwards into a gear box (not shown).

The crank mechanism described above has an advantageously reduced crankshaft length compared with a conventional crankshaft, and so can be used in any of the presently accepted multi-cylinder arrangements, that is to say radial, straight, flat or V-formation. This type of mechanism can also be used with any appropriate number of cylinders.

Figure 9:
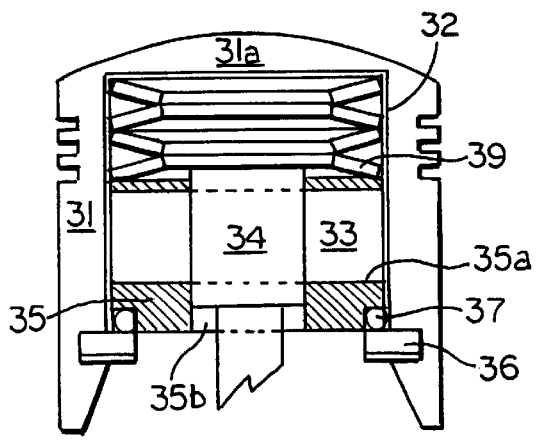
FIG. 9 is a schematic, part-sectional side elevation of a piston/connecting rod assembly constructed in accordance with the invention.
Figure 10:
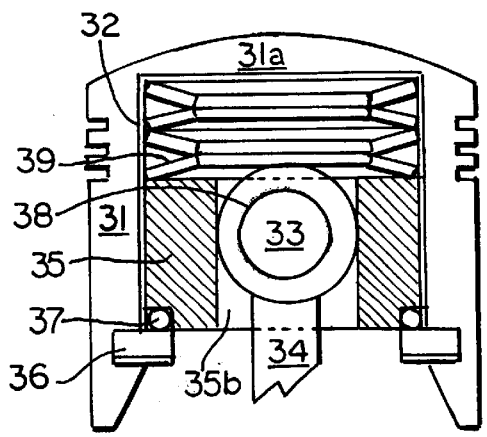
FIG. 10 is a schematic, part-sectional front elevation of the assembly of FIG. 9.
Figure 11:
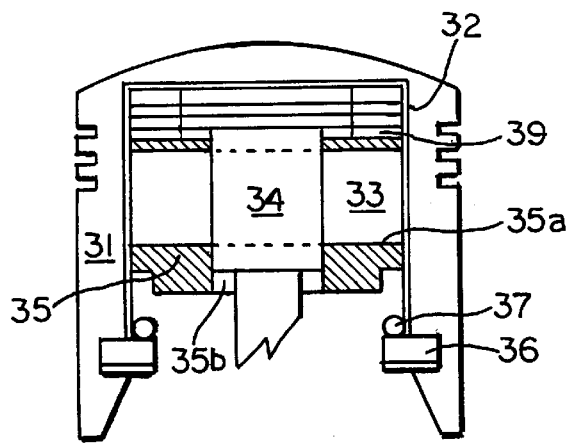
FIG. 11 is a schematic, part-sectional side elevation similar to that of FIG. 9, but showing the assembly in a different operating configuration.

The energy storing properties of the crank mechanism described above with respect to FIGS. 3 to 5 are not dependent upon the use of the cam 8 and the connecting rod/carrier configuration 3, 3a. Indeed, the principle of energy storing could be used with any form of piston/connecting rod assembly. Thus, FIGS. 9 to 11 show a hollow piston 31 of an internal combustion engine, the piston being made of aluminium and being reciprocable in a cast iron cylinder (not shown) in a conventional manner. A cup-shaped liner 32 made of carbon steel is fixed within the piston 31 by a bayonet or other suitable connection. In use, the piston 31 tuns a crankshaft (not shown) by means of a gudgeon pin 33, a connecting rod 34, and a crank pin (not shown), all of which are made of carbon steel. The gudgeon pin 33 is an interference fit within a cylindrical aperture 35a formed within a cylindrical carrier 35 made of aluminum. The carrier 35 is a sliding fit within the liner 32, a ring 36 made of aluminum and fixed to the internal wall of the piston 31 constituting a stop for limiting movement of the carrier towards the crankshaft within the piston. A Viton O-ring 37 is provided to act as a buffer between the carrier 35 and the ring 36. The arrangement is such that the piston 31 is able to move towards the crank pin by a distance approximately equal to the cylinder clearance volume height (the distance between the mean height of the crown 31a of the piston 31 ad the mean height of the top of the combustion chamber).

The connecting rod 34 passes through a generally rectangular aperture 35b formed in the carrier 35, and is connected to the gudgeon pin by a small end bearing 38. The square aperture 35b is at right-angles to the cylindrical aperture 35a A set of disc springs 39 made of titanium is positioned between the top of the carrier 35 and the crown 31a of the piston 31.

In use, ignition takes place at a predetermined time before TDC, so that the expanding gases formed by the ignition combustion force the piston 31 to descend rapidly within the cylinder during the power stroke. Prior to reaching TDC, however, the pressure in the cylinder will build up to a high value, and the piston 31 is forced towards the crank pin, against the force of the disc springs 39, with respect to the carrier 35. This compresses the disc springs 39 (as shown in FIG. 11—which shows the arrangement at the start of the power stroke), and increases the volume above the piston 31, causing a reduction in pressure and temperature in the cylinder. The lowered temperature reduces radiation losses and the heat lost to the cooling water and subsequently to the exhaust, with the pressure being shared equally between the cylinder clearance volume and the disc springs 39. This energy stored in the disc springs 39 is released when the piston 31 has passed TDC, and leads to the production of output torque. This is achieved as the spring pressure is now combined with the cylinder pressure after TDC. A large proportion of this stored energy would otherwise have been lost as heat, owing to the fact that the fuel/air mixture must be ignited before TDC, which is a result of the requirement for the ignited fuel/air to reach maximum pressure by TDC.

The action of this arrangement means that, when the engine is firing normally, there will be movement of the piston 31 with respect to the connecting rod 34 (and hence to its crank pin) on every power stroke. The ignition timing of the engine is such that ignition occurs between approximately 10° and 40° before TDC, depending upon the engine's load and speed.

The affect of providing the energy storing springs 39 is to reduce considerably the engine fuel consumption without reducing its power output. UA minimum of 30% improvement can be achieved without a compression ratio adjustment, and up to 60% with compression ratio adjustment.

Not only is the efficiency of the engine improved, but the exhaust emissions are also reduced. Thus, by decreasing the fuel consumption, the quantity of emissions is reduced; by lowering the temperature of combustion (in the non-increased compression ratio case), the nitrous oxide emissions are greatly reduced; and, by increasing the efficiency of the engine, unburnt hydrocarbon emissions are reduced.

In a standard internal combustion engine, an exhaust valve is usually opened before the associated piston reaches BDC, to allow the continuing expanding gases to rush out of the exhaust, thereby assisting the entrance of a fresh charge of fuel and air into the cylinder during valve overlap (that is to say when both the inlet and outlet valves are open), such that the exhaust gases are effectively scavenged from the combustion chamber. The act of opening the exhaust valve early promotes the emission of unburnt hydrocarbons, and prevents the continuing expanding gases from providing mechanical rotation of the crankshaft, as these gases are vented to atmosphere. The use of the springs 39, however, not only allows more efficient use of the fuel/air mixture, but, if used with an increased compression ratio, allows the use of a cam shaft designed such that the exhaust valve remains closed until almost BDC. The clearance volume in the cylinder will, therefore, be considerably reduced, thereby effectively clearing most of the exhaust gases from the combustion chamber without the need to release the pressure in the cylinder by opening the exhaust valve early. This late opening of the exhaust valve cam design can be applied advantageously to any engine utilising the spy 39.

The use of the disc springs 39, coupled with the mass of the engine's flywheel, gives the whole assembly a frequency (rpm) at which it is resonant. This could be used to advantage when employed in an engine designed to run at a constant speed.

It will be apparent that modifications could be made to the piston/connecting rod assembly described above. In particular, any suitable form of spring could be used in place of the stack of titanium springs, and this spring could be positioned anywhere between the piston crown and the crank pin. For example, a spring could be mounted between the top (the small end) and the bottom (the big end) of the connecting rod 34. It would also be possible to make the disc springs of spring steel. The various parts of the assembly could also be made of any standard material, for example the piston could be made of titanium, cast iron or a high tensile silicon and aluminium alloy.

The piston/connecting rod assembly described above could be used in any form of reciprocating internal combustion engine, with any arrangement and number of cylinders, utilising any type of fuel such as petrol, diesel, gas or steam. It could also be used in a compressor where the loss of heat energy is usually significant.

It would also be possible to operate either the sprung piston on its own, or the sprung piston with the cam engine as described above on a two-stroke cycle. The crank mechanism of the invention could also be incorporated in other forms of reciprocating engine such as a steam engine. Obviously, such a crank mechanism could also form part of a pump for converting rotary motion of an input shaft to reciprocatory motion of a piston in a cylinder. Such a pump would have a much greater efficiency than a conventionally-cranked device. Indeed, the crank mechanism of the invention can be used with considerable advantage in any form of reciprocatory/rotary or rotary/reciprocatory arrangement, in any single or multi-cylinder configuration, and with any suitable fuel.

What is claimed is:

1. An engine comprising a cylinder, a combustion chamber, a piston reciprocable within the cylinder, a connecting rod and a rotatable output shaft, the piston being in drivable connection with the output shaft via the connecting rod, a drive ring and a torque lobe, wherein the torque lobe is a circular plate eccentrically mounted on the output shaft for rotation therewith about the axis thereof, wherein the drive ring is an annular sleeve which is rotatable around the rim of the torque lobe, and is in contact therewith, and wherein the connecting rod is slidably mounted with respect to a carrier fixed to the drive ring for axial movement relative thereto, one end of the connecting rod being pivotally fixed to the piston, the other end of the connecting rod being engageable with a cam fixed to the torque lobe whereby rectilinear movement of the piston is converted to rotary movement of the torque lobe or vice versa, the cam and the mounting of the connecting rod with respect to its carrier being such that the turning moment of the output shaft is maximized substantially at the same time as the pressure of expanding gases resulting from ignition within the combustion chamber is maximized.

2. An engine as claimed in claim 1, wherein means are provided for biassing the connecting rod towards the output shaft relative to the carrier.

3. An engine as claimed in claim 2, wherein a spring acting between the connecting rod and the carrier constitutes the biassing means.

4. An engine as claimed in claim 1, wherein the arrangement is such that said other end of the connecting rod engages the cam only over the power and exhaust strokes of a four-stroke cycle.

5. An engine as claimed in claim 4, wherein the cam has first and second cam faces, said other connecting rod end engaging the first cam face on the power stroke, and engaging the second cam face on the exhaust stroke.

6. An engine as claimed in claim 1, further comprising detachable locking means for locking the connecting rod to the carrier prior to the commencement of the induction stroke.

7. An engine as claimed in claim 2, further comprising detachable locking means for locking the connecting rod to the carrier prior to the commencement of the induction stroke, the locking means being such that the connecting rod is locked to the carrier only over the compression and induction strokes, thereby preventing the spring biassing the connecting rods towards the output shaft and into engagement with the cam.

8. An engine as claimed in claim 7, wherein the locking means is constituted by a pair of alignable holes within the connecting rod and the carrier and by a locking member movable between a first, unlocked position in which it lies wholly within one of said holes, and a second, locked position in which it lies partially within both holes.

9. An engine as claimed in claim 8, wherein said one hole is within the carrier.

10. An engine as claimed in claim 8, further comprising means for biassing the locking member towards its second position.

11. An engine as claimed in claim 10 wherein a leaf spring biases the locking member toward its second position one end of the leaf spring being fixed to the carrier, the other end being engageable with the locking member.

12. An engine as claimed in claim 6, further comprising actuating means for releasing the locking means prior to the commencement of the power stroke.

13. An engine as claimed in claim 9, further comprising actuating means for releasing the locking means before commencement of the power stroke, said actuating means being constituted by an actuating rod engageable with an unlocking member housed at least partially within the hole in the connecting rod.

14. An engine as claimed in claim 13, wherein movement of the connecting rod relative to the carrier to align their holes is controlled in dependence upon the engagement of said other end of the connecting rod with a third cam face provided on the cam between the second cam face and the first cam face.

15. An engine as claimed in claim 13, wherein the piston has a main piston body and a piston crown movable axially relative thereto, spring means acting between the piston crown and the main piston body biassing the piston crown away from the main piston body, and wherein the actuating rod is carried by the piston crown, thereby biassing the actuating rod out of engagement with the unlocking member unless the pressure of expanding gases in the combustion chamber acts to compress said spring means.

16. An engine as claimed in claim 15, wherein the arrangement is such that ignition t place before the piston reaches TDC on the compression stroke, and such that the spring means is compressed, thereby storing energy, by the expanding gases resulting from its combustion following ignition.

17. An engine as claimed in claim 13, wherein the carrier is hollow, and the connecting rod is positioned within the carrier, the connecting rod and the carrier each being provided with a pair of diametically-opposed holes, a pair of locking members, a pair of unlocking members, and a pair of leaf springs, the actuating rod being engageable with the inner ends of the unlocking members, and the outer ends of the unlocking members being in engagement with the inner ends of the locking members.

18. An engine as claimed in claim 1, wherein there are a pair of drive rings and a pair of associated torque lobes, the carrier is fixed to the drive rings, and the cam is positioned between the two torque lobes.

19. An engine as claimed in claim 1, wherein said other end of the connecting rod is provided with a cam follower for engagement with the cam.

20. An engine as claimed in claim 19, wherein a needle roller bearing constitutes the cam follower.

21. A piston and connecting rod assembly for an internal combustion engine, the assembly comprising a piston, a connecting rod, and a spring, the connecting rod having a first end operatively associated with the piston for movement therewith, and a second end connectible to a rotary output shaft, wherein the spring acts between the piston and the connecting rod to bias the connecting rod away from the crown of the piston, and wherein the piston is movable towards the second end of the connecting rod by a distance substantially equal to the cylinder clearance volume height, wherein the piston is hollow and the connecting rod is connected to the piston by a gudgeon pin mounted within a carrier which is slidably mounted within the piston for axial movement relative thereto and wherein movement of the carrier within the piston is limited by the spring in the direction of movement towards the crown and by a stop member fixed in the interior of the piston in the direction of movement away from the crown and further including a buffer provided between the carrier and the stop member.

22. An assembly as claimed in claim 21, wherein the piston is hollow, and the connecting rod is connected to the piston by a gudgeon pin.

23. An assembly as claimed in claim 22, wherein the spring acts between the piston crown and gudgeon pin, the gudgeon pin being movable relative to the piston in the axial direction thereof.

24. An assembly as claimed in claim 23, wherein the gudgeon pin is mounted within a carrier which is slidably mounted within the hollow piston for axial movement relative thereto.

25. An assembly as claimed in claim 21, wherein a set of disc springs constitutes the spring.

26. An assembly as claimed in claim 25, wherein the disc springs are made of titanium.

27. An assembly as claimed in claim 21, where the assembly is such that it has a resonant frequency.

28. An assembly as claimed in claim 21, wherein an O-ring made of a fluoroelastomer constitutes the buffer.

29. An internal combustion engine comprising a cylinder, a piston and connecting rod assembly including a piston, a connecting rod, and a spring, the connecting rod having a first end operatively associated with the piston for movement therewith, and a second end connectible to a rotary output shaft, wherein the spring acts between the piston and the connecting rod to bias the connecting rod away from the crown of the piston and wherein the piston is movable towards the second end of the connecting rod by a distance substantially equal to the cylinder clearance volume height a rotary output shaft, means for igniting a fuel/air mixture in the cylinder, and means for actuating the ignition means, the actuating means being such that ignition takes place before the piston reaches TDC on the compression stroke, and the arrangement is such that the spring is compressed by the expanding gases resulting from the combustion following ignition, before the piston reaches TDC.

30. An engine as claimed in claim 29, wherein the actuating means is such that ignition takes place between 10° and 40° before TDC.

31. An engine as claimed in claim 29, wherein the arrangement is such that the ignited fuel/air mixture reaches a maximum pressure substantially 12° after TDC.

32. An engine as claimed in claim 29, further comprising a cam shaft and an exhaust valve, the arrangement being such that the exhaust valve remains closed until substantially BDC.

33. A piston and connecting rod assembly for an internal combustion engine, the assembly comprising a piston, a connecting rod, and a spring, the connecting rod having a first end operatively associated with the piston for movement therewith, and a second end connectable to a rotary output shaft, wherein the spring acts between the piston and the connecting rod to bias the connecting rod away from the crown of the piston, and wherein the spring is rated so that it is compressed during a compression stroke of the piston, only by expanding gases resulting from combustion following ignition of fuel/air mixture in a cylinder associated with the piston, the compression of the spring storing energy which is released as the spring expands during a subsequent power stroke.

34. An internal combustion engine comprising a cylinder, a piston and connecting rod assembly including a piston, a connecting rod, and a spring, the connecting rod having a first end operatively associated with the piston for movement therewith, and a second end connectable to a rotary output shaft, wherein the spring acts between the piston and the connecting rod to bias the connecting rod away from the crown of the piston, a rotary output shaft, means for igniting a fuel/air mixture in the cylinder, and means for actuating the ignition means, the actuating means being such that ignition takes place before the piston reaches TDC on the compression stroke, and the arrangement is such that the spring is compressed by the expanding gases resulting from the combustion following ignition, before the piston reaches TDC, and wherein the piston is movable towards the second end of the connecting rod by a distance substantially equal to the cylinder clearance volume height, thereby reducing the cylinder pressure by substantially one half and storing energy equivalent to the other half in the spring for release after the piston passes TDC.

* * * * *

UNITED STATES PATENT AND TRADEMARK OFFICE
CERTIFICATE OF CORRECTION

PATENT NO. : 6,223,703 B1
DATED : May 1, 2001
INVENTOR(S) : George F. Galvin

It is certified that error appears in the above-identified patent and that said Letters Patent is hereby corrected as shown below:

Claim 16,
Line 2, after the word "ignition," delete "t" and add -- takes --

Signed and Sealed this

Twenty-seventh Day of November, 2001

Attest:

NICHOLAS P. GODICI
Attesting Officer        Acting Director of the United States Patent and Trademark Office